United States Patent
Kingsford et al.

[11] Patent Number: 5,645,301
[45] Date of Patent: Jul. 8, 1997

[54] FLUID TRANSPORT COUPLING

[75] Inventors: Kenji A. Kingsford, Devore; David R. Martinez, Corona, both of Calif.

[73] Assignee: Furon Company, Laguna Niguel

[21] Appl. No.: 556,403

[22] Filed: Nov. 13, 1995

[51] Int. Cl.⁶ .................................................. F16L 55/00
[52] U.S. Cl. .................. 285/14; 285/331; 285/336; 285/351; 285/354; 285/423; 285/906
[58] Field of Search .......................... 285/328, 331, 285/330, 336, 334.2, 352, 99, 351, 910, 14, 423, 354, 906

[56] References Cited

U.S. PATENT DOCUMENTS

| | | | |
|---|---|---|---|
| 388,112 | 8/1888 | Bodycomb | 285/331 X |
| 508,765 | 11/1893 | Rouse | 285/336 X |
| 1,302,314 | 4/1919 | Cornell | 285/331 X |
| 1,537,755 | 5/1925 | Dowling | 285/331 |
| 1,715,854 | 6/1929 | Martyn | 285/331 |
| 1,884,551 | 10/1932 | Boynton | 285/331 X |
| 2,340,732 | 2/1944 | Bruno | 285/331 |
| 3,141,685 | 7/1964 | Watts | 285/331 X |
| 3,594,022 | 7/1971 | Woodson | 285/336 |
| 3,819,211 | 6/1974 | Knox | 285/336 |
| 4,063,758 | 12/1977 | Westberg | 285/336 X |
| 4,441,725 | 4/1984 | Bailey | 285/336 X |
| 4,799,717 | 1/1989 | Kingsford | 285/341 |
| 4,871,196 | 10/1989 | Kingsford | 285/138 |
| 5,039,140 | 8/1991 | Szymczak | 285/334.2 |
| 5,090,871 | 2/1992 | Story et al. | 417/9 |
| 5,196,814 | 3/1993 | Felker et al. | 285/336 X |
| 5,197,766 | 3/1993 | Gloug | 285/14 |
| 5,433,454 | 7/1995 | Ramberg | 285/336 X |

FOREIGN PATENT DOCUMENTS

| | | | |
|---|---|---|---|
| 1272997 | 8/1961 | France | 285/331 |
| 833252 | 4/1960 | United Kingdom | 285/336 |

*Primary Examiner*—Dave W. Arola
*Attorney, Agent, or Firm*—Christie, Parker & Hale, LLP

[57] ABSTRACT

A coupling apparatus includes first and second coupling members each having the form of a hollow conduit having a radially extending flange at a first end, an axially extending sleeve defining a second end adapted to connect with a fluid transport fitting, and a fluid transport passageway running axially therethrough. Each flange has a generally planar axially facing frontside surface. In one embodiment, the frontside surface of the first coupling member flange has at least one integral tongue extending axially outwardly therefrom, and the frontside surface of the second coupling member flange has at least one groove disposed axially therein. Each tongue is placed within a respective tongue to form a liquid-tight seal when frontside surfaces of the first and second coupling member flanges are joined together. In another embodiment, the frontside surfaces of each first and second coupling flange include at least one groove disposed axially therein. At least one seal ring independent from the flanges is interposed between adjoining frontside surfaces so that axially facing edges of the seal ring placed within respective grooves to form a liquid-tight seal when the frontside surfaces of the first and second coupling member flanges are joined together. The frontside surfaces are held together by a nut installed over the first and second coupling member flanges.

31 Claims, 4 Drawing Sheets

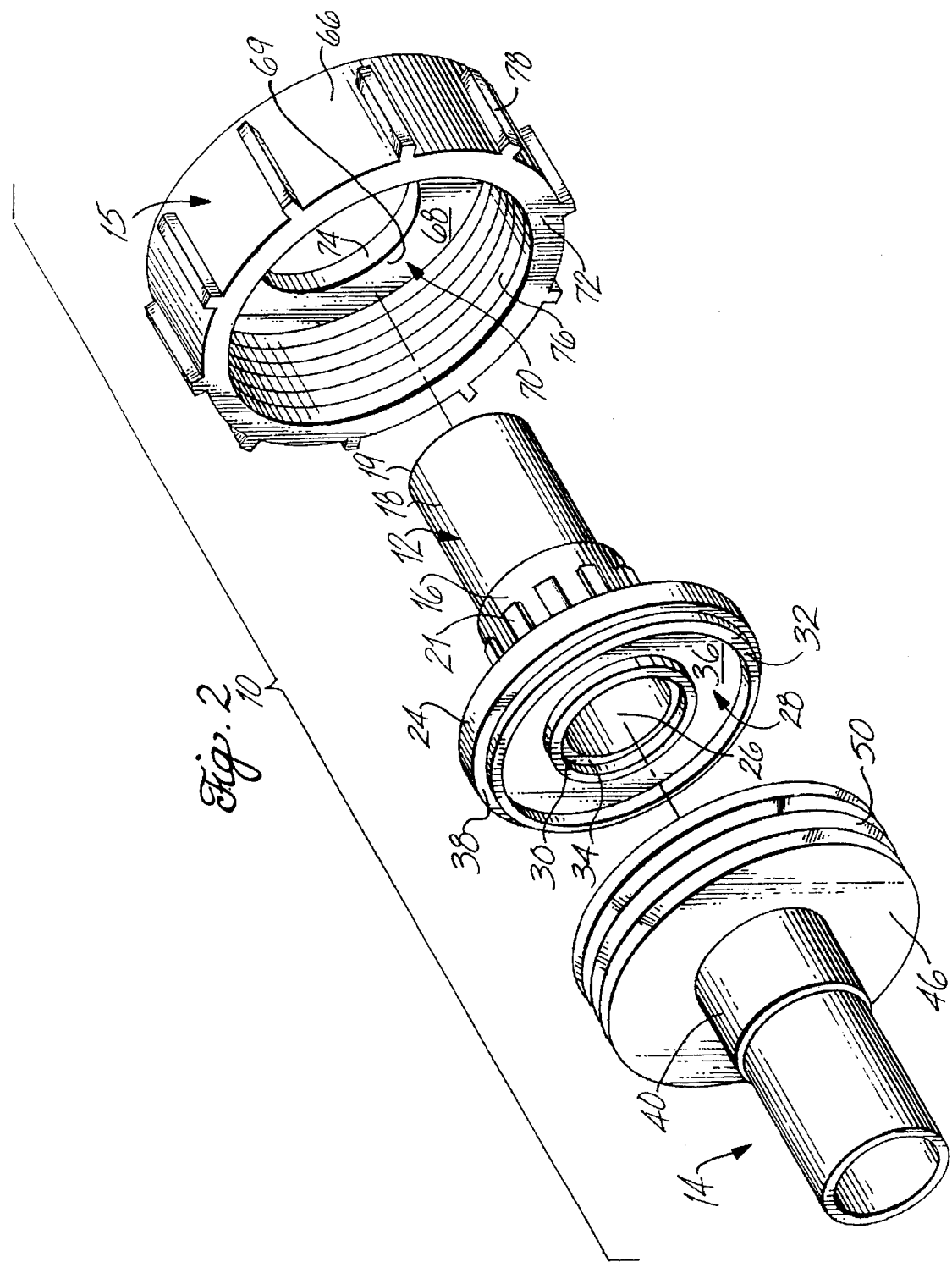

FLUID TRANSPORT COUPLING

FIELD OF THE INVENTION

The present invention relates generally to a fluid transport seal arrangement and, more particularly, to a tongue and groove coupling seal capable of providing a liquid-tight seal with minimal torque load and having zero hold up volume.

BACKGROUND OF THE INVENTION

Pipe system couplings and unions that are used in fluid handling systems typically have a seal mechanism that depends on the use of a compressible elastomeric member to provide a liquid-tight seal. Such pipe couplings are used in the piping systems of high-purity manufacturing processes, such as semiconductor manufacturing, that depend on the integrity of such seals to both protect the transported process fluid against contamination from an external source, and to protect the immediate environment and personnel from possible contact with spilled process fluid. It is, therefore, desired that the seal integrity of pipe system couplings used in such applications be extremely high.

Pipe system couplings that depend on compressible elastomeric members such as O-rings typically consist of complementary first and second coupling members. The first coupling member includes a groove located in a facing surface to accommodate partial placement of an O-ring seal therein, and the second coupling member has a flat facing surface that contacts an opposite surface of the O-ring seal. The O-ring seal can be made of conventional elastomeric material such as rubber, nitrile rubber and the like. The O-ring seal is positioned between the coupling members concentrically around the flow path of the process fluid through the coupling members. A threaded coupling nut can be used to force the coupling members together and compress the O-ring seal therebetween. A liquid-tight seal can be achieved by applying a sufficient torque to the nut to compress the O-ring seal to completely fill the respective grooves.

One disadvantage of pipe system couplings that use an O-ring sealing mechanism relates to the placement of the O-ring seal between the coupling members and the degree of compression by the O-ring seal. When the O-ring seal is compressed between the coupling member, by applying sufficient torque to the nut, there remains facing surface portions of each coupling member between the fluid flow path and the O-ring seal that are wetted by the process fluid. This wetted area forms a hold-up volume for process fluid within the coupling when fluid flow is terminated, causing the process fluid to be retained therein.

The presence of a hold-up volume in a pipe system coupling is not desirable, as the retained process fluid could introduce contamination into the fluid handling system if a subsequent different process fluid is transferred therethrough. Additionally, when the retained process fluid is water, e.g., deionized water used in high-purity rinsing applications and the like, such water can stagnate and induce biological growth. Such Biological growth in high-purity piping systems is not desirable because it contaminates the process fluids and any components that have been manufactured using such process fluid.

Another disadvantage of pipe system couplings which use O-ring-type seal mechanisms relates to the eventual degradation of the O-ring material when it is placed in contact with corrosive or caustic process fluids. To perform their function properly, an O-ring must necessarily be made from a material capable of being elastomerically compressed, such as rubber, modified rubber and the like. Such materials are known to experience some degree of degradation when exposed to caustic or corrosive process fluids, such as those used in the semiconductor manufacturing industry. As O-ring seals degrade, the degraded material enters the process fluid, causing it to become contaminated, which in turn contaminates and components that are contacted by the fluid. Furthermore, once the O-ring begins to degrade the liquid-tight seal is compromised, resulting in leakage into or out from the system.

A proposed solution to the problem of degrading O-rings was to manufacture an O-ring seal having an elastomeric body coated with a chemically resistant fluoropolymeric compound. Such fluoropolymeric materials, for example, are tetrafluoroethylene sold by DuPont under the trademark Teflon®. In order to retain a sufficient degree of compressibility using the coated O-ring it is necessary that such Teflon® coatings on the O-ring be very thin. Process fluids are known to permeate through such thin Teflon® coatings, thereby exposing the easily degradable elastomeric material to the process fluid. Additionally, thin Teflon® coatings are known to degrade when exposed to caustic or corrosive process fluids such as hydrochloric acid and hydrofluoric acid, thereby also exposing the easily degradable elastomeric material. Furthermore, the use of Teflon® coated O-rings does not remedy the problem of creating a hold up volume and related process/product contamination.

It is, therefore, desired that a pipe system coupling or union be constructed having a sealing mechanism that does not contaminate the process fluid, and that does not have a hold-up volume. It is further desired that the pipe system coupling sealing mechanism be easy to use without the need to depend on specialized installation equipment, be formed from readily available materials, and be made using conventional manufacturing techniques.

SUMMARY OF THE INVENTION

A coupling apparatus constructed according to principles of this invention is constructed having at least one tongue and groove-type sealing mechanism that does not contaminate the process fluid, and that does not have a hold-up volume. The coupling apparatus includes a first and second coupling members having the form of a hollow cylindrical conduit. Each coupling member includes a radially extending flange at a first end, an axially extending sleeve that defines a second end adapted to connect with a fluid transport fitting, and a fluid transport passageway running axially therethrough. Each coupling member flange includes a generally planar axially facing frontside surface.

In one embodiment, the first coupling member flange includes at least one integral tongue that is positioned concentrically around the outside of the passageway and that projects axially outwardly a distance from the frontside surface. The second coupling member flange includes at least one groove that is positioned concentrically around the outside of the passageway, and that is disposed axially within the frontside surface to accommodate placement of the tongue therein. A liquid-tight seal is formed when frontside surfaces of the first and second coupling member flanges are joined together.

In another embodiment, the first and second coupling member flanges each include at least one groove that is disposed axially within respective frontside surfaces, and that is positioned circumferentially around each respective passageway. At least one seal ring that is independent of the coupling members is interposed between adjoining frontside surfaces of the first and second coupling member flanges so that axially outwardly facing edges of the seal ring are disposed within respective grooves to form a liquid-tight seal when the frontside surfaces of the first and second coupling member flanges are joined together. The frontside surfaces of the first and second coupling member flanges also include planar surface sections that are placed in interfacing contact with one another, when the frontside surfaces of the first and second coupling member flanges are joined together, to provide coupling mating surfaces having a zero hold-up volume.

The frontside surfaces of the coupling members are retained together by a nut that is installed over the first and second coupling member flanges and tightened to a desired torque.

BRIEF DESCRIPTION OF THE DRAWINGS

These and other features and advantages of the present invention will become appreciated as the same becomes better understood with reference to the specification, claims and drawings wherein:

FIG. 2 is an exploded view of the first embodiment of the coupling assembly of FIG. 1;

DETAILED DESCRIPTION

This invention relates to a pipe system coupling or union comprising a tongue and groove sealing mechanism. Couplings constructed according to principles of this invention include a first and second coupling member that are held together, with frontside surfaces in interfacing contact with one another, by a threaded nut. One or more tongue and groove sealing mechanism is interposed between the interfacing frontside surfaces to provide a liquid-tight seal. The frontside surfaces of the coupling members, and the tongue and groove seal(s), to provide coupling mating surfaces having a zero fluid hold-up volume when join together.

Figure 1:
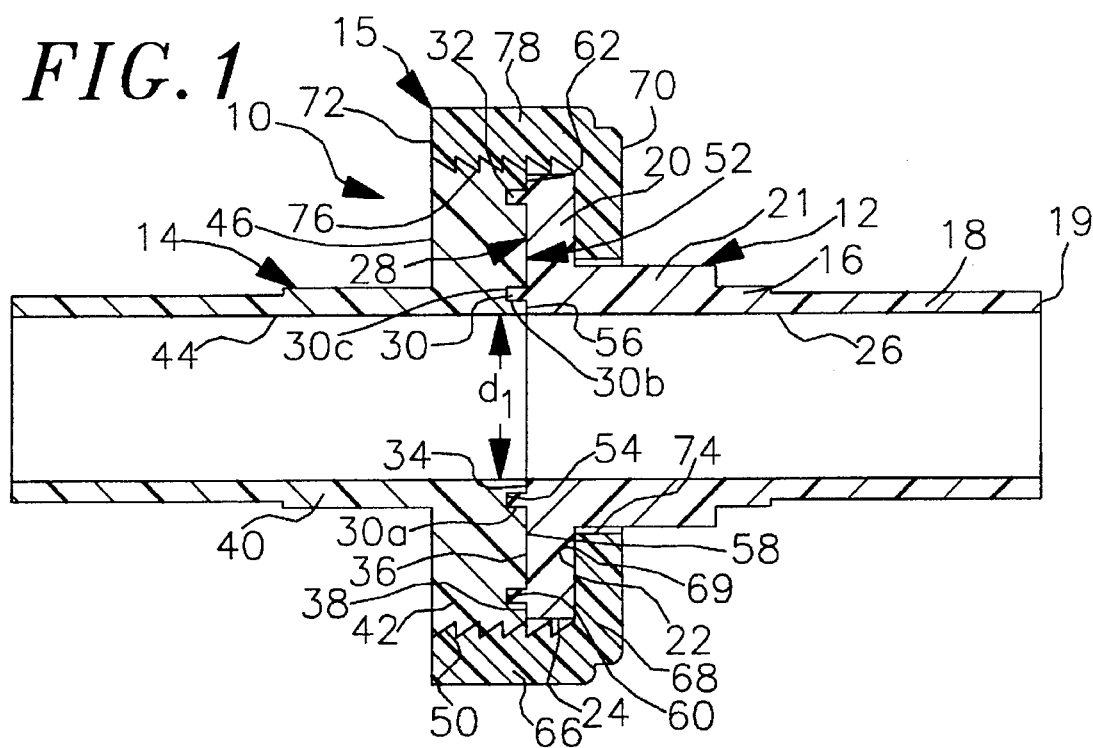
FIG. 1 is a cross-sectional side elevational view of a first embodiment of a coupling assembly constructed according to principles of this invention.

Referring to FIGS. 1 and 2, a first embodiment of a coupling apparatus 10, constructed according to principles of this invention, comprises a first coupling member 12 and a second coupling member 14 joined together by a coupling nut 15. The first coupling member 12 is in the form of a hollow cylindrical conduit having a radially extending flange 20 at a one end, and having a cylindrical annular sleeve 16 that extends axially away from an axially facing backside surface 22 of the flange 20. The sleeve 16 includes a reduced diameter section 18 that extends axially a distance to define an opposite end 19. The first coupling end 19 is sized to facilitate connection with an end of a pipe or the like.

The flange 20 is generally cylindrical in shape and has a outside diameter greater than the sleeve 16. As best shown in FIG. 2, the sleeve 16 includes a number of ribs 21 on its outside surface, each of which projects radially a distance from the sleeve surface and extends axially a distance along the sleeve. In an exemplary embodiment of the first coupling member 12, approximately six ribs 21 are provided. The ribs 21 act to space and align the coupling nut 15 that is placed over the sleeve, as described in better detail below.

Referring to FIG. 1, the flange 20 has an axially facing frontside surface 28 opposite the backside surface 22 with both such surfaces being perpendicular to the axis of the sleeve. The flange 20 has a planar circumferential edge 24 that defines its outside diameter. An annular fluid flow passageway 26 extends axially through the sleeve 16 and the flange 20 of the first coupling member 12. The flange frontside and backside surfaces are generally flat or planar, with the exception of tongues 30 and 32 which each project axially outward and away from the frontside surface 28.

Moving radially away from the fluid flow passageway 26 along the frontside surface 28 toward the circumferential edge 24 of the flange 20, the first tongue 30 is positioned concentrically around the passageway 26, is integral with the frontside surface 28 and extends axially outward therefrom. The tongue 30 has an inside diameter "$d_1$" that is greater than the diameter of the passageway 26, forming a planar first frontside surface section 34 between the first tongue 30 and the passageway 26. In a preferred first embodiment, the first tongue 30 has an axial length to radial width or thickness in the range of from about 1.5:1 to 2:1, so that the distance that the tongue 30 axially projects from the frontside surface 28 is in the range of from about 1.5 to 2 times greater than the radial thickness of the tongue. The first tongue 30 is configured having flat circumferential wall surfaces 30a and 30b, and having a flat end surface 30c.

Moving radially away from the first tongue 30, the frontside surface 28 includes a planar second frontside surface section 36. In a preferred first embodiment, the second frontside surface section 36 has a surface area greater than the first frontside surface section 34, due to the radial placement of a second tongue 32 on the frontside surface. The second tongue 32 is integral with the frontside surface 28 and extends from the frontside surface in an axial direction. The second tongue 32 is positioned concentrically around the first tongue 30 and adjacent the circumferential edge 24. The second tongue 32 is configured in the same manner as the first tongue 30 described above. A planar third frontside surface section 38 is interposed between the second tongue 32 and the circumferential edge 24.

In an example first coupling member 12 embodiment, the first coupling end 19 is sized to facilitate connection with a pipe having an inside diameter of approximately 20 millimeters. The sleeve 16 has an outside diameter of approximately 28 millimeters, extends axially from the flange 20 a distance of approximately 14 millimeters, and includes six ribs 21 that extend radially from the sleeve surface approximately 2 millimeters. The flange circumferential edge 24 has a diameter of approximately 60 millimeters with the first tongue 30 having an outside diameter of approximately 28 millimeters, and the second tongue 32 having an outside diameter of approximately 59 millimeters. Both the first tongue 30 and the second tongue 32 each have a wall thickness of approximately 1.6 millimeters and project axially a distance from the frontside surface 28 a distance of approximately 2.9 millimeters.

The second coupling member 14 is configured much the same as the first coupling member 12, in the form of a hollow cylindrical conduit comprising a cylindrical sleeve 40, that projects axially outward a distance from a radially extending flange 42 at one end of the coupling member, and a fluid flow passageway 44 that extends axially through the sleeve 40 and flange 42. The flange 42 is configured similar to the flange 20 of the first coupling member 12, having a generally planar axially facing backside surface 46 perpendicular to the sleeve 40, and having a circumferential edge 50 that defines its outside diameter. The circumferential edge 50 is threaded to accommodate threaded connection with the coupling nut 15, discussed in detail below.

The flange 42 of the second coupling member 14 has an axially facing frontside surface 52, opposite from the backside surface 46, that is generally planar. The frontside surface 52 is configured to complement and mate with the frontside surface 28 of the flange 20. Moving radially outward from the passageway 44 to the circumferential edge 50, the frontside surface 52 includes a first groove 54 that is positioned concentric with the passageway. The first groove 54 extends axially into the frontside surface a sufficient depth to accommodate placement of the first tongue 30 therein when the frontside surfaces of the first and second coupling member flanges are joined together.

A planar first frontside surface section 56 extends radially along the frontside surface 52 between the first groove 54 and the passageway 44. The first frontside surface section 56 is sized having a surface area equal to the surface area of the first frontside surface section 34 of the flange 20 for the first coupling member 12. The first frontside surface section 56 is positioned along the frontside surface 52 to contact the first frontside surface section 34 when the frontside surfaces of the first and second coupling members are joined together.

The first groove 54 is sized having an axial depth slightly less than the axial length of the first tongue 30, and having a width slightly thinner than the radial thickness of the first tongue, to provide a good interference fit when joined together. In a preferred first embodiment, for a coupling sized to be connected with a 20 millimeter (¾ inch) pipe, the first tongue 30 is machined to have an axial length in the range of from 0.13 to 0.4 millimeters (0.005 to 0.015 inches) longer than the axial depth of the first groove 54, and to have a radial thickness in the range of from about 0.05 to 0.13 millimeters (0.002 to 0.005 inches) wider than the radial width of the first groove.

Moving radially away from the outside diameter of the first groove 54, the frontside surface 52 includes a planar second frontside surface section 58 that extends radially from the first groove 34 to a second groove 60. The second frontside surface section 58 is sized having a surface area equal to the that of the second frontside section 36 of the flange 20 for the first coupling member 12. The second frontside surface section 58 is positioned to contact the second frontside surface section 36 when the frontside surfaces of the first and second coupling members are joined together.

The second groove 60 is positioned within the frontside surface 52, concentrically around the outside diameter of the first groove 54. The second groove 60 extends axially within the frontside surface a sufficient depth to accommodate placement of the second tongue 32 therein and is configured and sized in the same manner as previously described for the first groove. A planar third frontside surface section 62 extends radially along the frontside surface 52 between an outside diameter of the second groove 60 and the circumferential edge 50. In the illustrated embodiment, the third frontside surface section 62 has a surface area that is greater than the third frontside surface section 38 of the flange 20 from the first coupling member 12. The third frontside surface section 62 is positioned to contact the entire third frontside surface section 38 when the frontside surfaces of the first and second coupling members are joined together.

In an example embodiment, for a coupling sized to connect with a pipe end having an inside diameter of approximately 20 millimeters, both the first groove 54 and the second groove 60 each have a radial width of approximately 1.6 millimeters and have an axial depth of approximately 2.4 millimeters.

As was stated above, a coupling nut 15 is used to retain the first and second coupling members together. The nut 15 has a generally cylindrical hollow body 66, a shoulder 68 that extends radially inward from the body at a first end 70, and has an open second end 72 opposite from the first end. The shoulder 68 has an annular opening 74 that extends axially therethrough and is concentric with an axis running through the hollow body 66. The opening 74 is sized slightly larger than the diameter measurement of the ribs 21 along the first coupling member sleeve 16. The hollow body 66 includes an inside surface 76 that is threaded to complement the threaded circumferential edge 50 of the second coupling member flange 42. The inside diameter surface 76 is sized slightly larger than the circumferential edge 24 of the first coupling member flange 20 to facilitate its placement thereover. As best shown in FIG. 2, the nut 15 can include a number of ribs 78 that project radially outward from its outside surface and extend axially a distance along the body 66.

In an example embodiment, where the first and second coupling member bodies are adapted to connect with a pipe having an inside diameter of approximately 20 millimeters, the nut body 66 has an outside diameter of approximately 73 millimeters, an inside threaded diameter of approximately 60 millimeters, and an opening 74 diameter of approximately 34 millimeters. The nut body includes approximately ten ribs 78 that each extend axially approximately 2 millimeters from the outside surface.

Referring to FIGS. 1 and 2, the coupling 10 is assembled by first placing the frontside surfaces of the first and second coupling member flanges together so that the first and second tongues 30 and 32 engage the respective first and second grooves 54 and 60 (seen best in FIG. 1), and so that respective first, second and third frontside surface sections engage one another. The nut 15 is placed over the first coupling member 12 so that the opening 74 in the wall section 68 fits over the ribs 21 in the first coupling member sleeve 16 and so that the inside diameter surface 76 of the nut body 66 passes over the circumferential edge 24 of the first coupling member flange 20.

The nut body 66 is rotated so that the threaded inside surface 76 engages the threaded circumferential edge 50 of the second coupling member flange 42, and is tightened. As the nut body is tightened, an inside surface 69 of the shoulder 68 engages the backside surface 22 of the first coupling member flange 20, causing the adjacent frontside surfaces of the first and second coupling members to be drawn together, and causing the tongues to completely fill the grooves. The nut body is tightened to a desired torque to ensure complete engagement of the tongues within respective grooves, and to ensure that the respective frontside surface sections are maintained in interfacing contact with one another. In a preferred first embodiment, complete engagement of the tongues within respective grooves, and contact between respective frontside surface sections is achieved when the nut is torqued within the range of from 2 to 50 foot pounds.

A key feature of the coupling apparatus of this invention is that a liquid-tight seal is provided without the need to provide a constant high-torque load on the coupling. For example, the coupling is capable of providing and maintaining a liquid-tight seal by tightening the nut onto the coupling by using only hand pressure.

It is desired that the coupling members be formed, i.e., either molded or machined, from a material that both resists corrosion and provides a desired degree of chemical resistance to corrosive and/or caustic process chemicals typically used in industrial manufacturing processes, such as in semiconductor manufacturing processes. Accordingly, polymeric materials such as fluoropolymeric compounds selected from the group consisting of tetrafluoroethylene (TFE), polytetrafluoroethylene (PTFE), fluorinated ethylene-propylene (FEP), perfluoroalkoxy fluorocarbon resin (PFA), polychlorotrifluoroethylene (PCTFE), ethylenechlorotrifluoroethylene copolymer (ECTFE), ethylenetetrafluoroethylene copolymer (ETFE), polyvinylidene fluoride (PVDF), and polyvinyl fluoride (PVF), and the like are preferred.

In a preferred first embodiment, in a non-water application, it is desired that the first and second coupling members be molded from PTFE (high density), commercially available under the product name PTFE. Teflon® is desired because, aside from its chemical resistance, it has a desired degree of cold flow that provides a good interference fit of each tongue within a respective groove, allowing the tongue to flow into and completely occupy its groove. It is also desired that the nut be formed from ETFE, due to its superior rigidity.

Another key feature of the coupling of this invention is that is has a zero hold-up volume to prevent the process fluid transported through the coupling from being retained or held up anywhere within the coupling. Zero hold-up volume is a result of tongues fitting within and completely filling respective grooves, and the configuration of complementary interfacing frontside surface sections along the frontside surfaces of the first and second coupling member flanges. Constructed in this manner, process fluid that is transported through the passageways 26 and 44 of the coupling is prevented from traveling or leaking radially between the interfacing first and second coupling member bodies.

Figure 3:
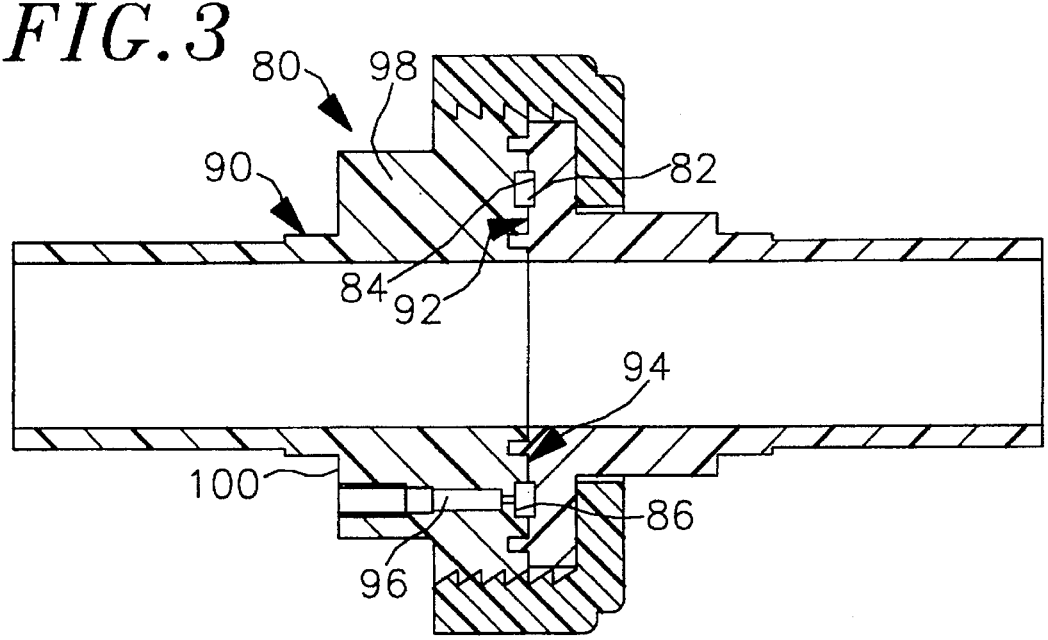
FIG. 3 is a cross-sectional side elevational view of an alternative first embodiment of a coupling assembly, constructed according to principles of this invention, having a fluid reservoir.

Referring to FIG. 3, an alternative first embodiment of a coupling 80 is illustrated which includes a circumferential fluid reservoir 82. The coupling 80 is similar to the coupling 10, specifically illustrated in FIGS. 1 and 2 and described above, except that second frontside surface sections 84 and 86 of the first and second coupling member flanges 88 and 98 are recessed axially a distance below the plane of each respective frontside surface 92 and 94. Alternatively, the reservoir 82 can be formed by recessing the second frontside surface section of either the first or the second coupling member flange instead of recessing both surfaces. The fluid reservoir 82 serves to accommodate any process fluid, that may have migrated past the first tongue and groove seal in the event of seal leakage or failure, for purposes of leak detection, leak containment and the like.

The second coupling member 90 is configured having at least one port 96 that extends axially through the flange 98, from the fluid reservoir 82 to the backside flange surface 100. The port 96 can be configured to accommodate connection with conventional invasive or non-invasive leak detection sensors and the like, or to accommodate connection with piping or tubing and the like to route any leaked process fluid away from the coupling for purposes of offboard containment or leak detection.

Figure 4:
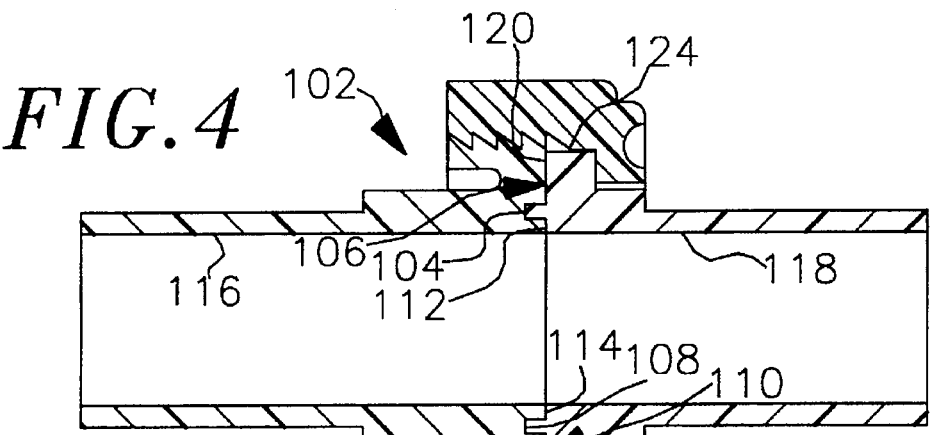
FIG. 4 a cross-sectional side elevational view of a second embodiment of a coupling assembly constructed according to principles of this invention.

Referring to FIG. 4, a second embodiment of a coupling 102 provided in accordance with practice of the present invention comprises a single tongue and groove seal mechanism. The coupling 102 is identical in all respects to the first coupling embodiment illustrated in FIGS. 1 and 2 described above, except that it contains only a single tongue 104 that projects axially outward a distance away from the first coupling member frontside surface 106, and one groove 108 disposed axially within the second coupling member frontside surface 110. Additionally, the interfacing first and second coupling member flange frontside surfaces each have two frontside surface sections, rather than three frontside surface sections as did the first embodiment. The frontside surface of the first and second coupling member flanges includes first frontside surface sections 112 and 114, that extend radially between each process fluid passageway 116 and 118 and a respective tongue or groove, and second frontside surface sections 120 and 122, that extend radially between a respective tongue or groove and each respective circumferential edge 124 and 126.

Although particular first and second coupling embodiments have been specifically described and illustrated, it is to be understood that coupling embodiments other than those described and illustrated are intended to be within the scope of this invention. For example, couplings that have one or more tongue(s) that project axially from the frontside surface of a first coupling member flange, and that have respective complementary grooves that are disposed axially within the frontside surface of a second coupling member flange, are understood to be within the scope of this invention.

Figure 5A:
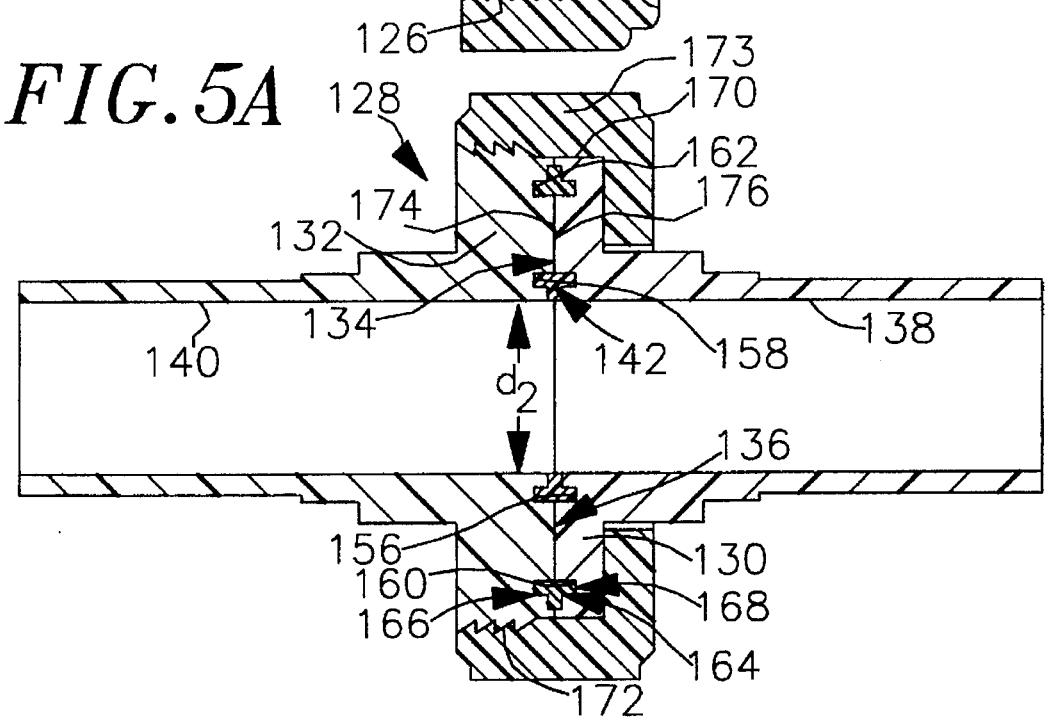
FIG. 5A is a cross-sectional side elevational view of a third embodiment of a coupling assembly constructed according to principles of this invention.

Referring to FIG. 5A, a third embodiment of a coupling 128 provided in accordance with practice of the present invention includes a double tongue and groove seal mechanism, where the tongues are not integral with but rather are independent from the first and second coupling member flanges 130 and 132. The coupling 128 is identical in all respects to the first coupling embodiment described above, except that the frontside surfaces 134 and 136 of respective first and second coupling member flanges 130 and 132 are each configured having two symmetrically similar grooves adapted to accommodate two independent symmetrically similar circular seal rings.

Figure 5B:
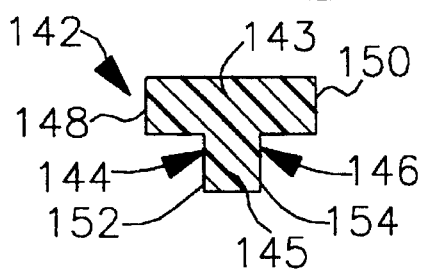
FIG. 5B is an enlarged cross-sectional side elevational view of a seal ring from the coupling assembly of FIG 5A.

Moving radially outward from process fluid flow passageways 138 and 140, a first seal ring 142 is disposed between the first and second coupling members. Referring to FIGS. 5A and 5B, the first seal ring 142 is configured having a T-shaped cross-sectional profile, with the top surface of a cross member 143 of the T defining an outside diameter of the ring, and with a bottom surface of the stem member 145 of the T defining an inside diameter of the ring. As best shown in FIG. 5B, the first seal ring 142 has symmetrical axially outwardly facing sealing edges 144 and 146. Each of the sealing edges 144 and 146 includes respective axially extending cross member edge portions 148 and 150 positioned adjacent the top portion of the T. Each of the sealing edges 144 and 146 also includes respective radially extending stem member edge portions 152 and 154 positioned adjacent the bottom portion of the T. The cross member edge portions each extend axially a distance from respective stem member edge portions.

Although a seal ring having a T-shaped cross-sectional profile has been described and illustrated, it is to be understood that seal rings having other geometrically shaped profiles such as square, rectangular and the like, are intended to be within the scope of this invention. For example, seal rings having a rectangular shaped profile have been constructed and experimented with for use with the third coupling embodiment, but have been found to lack a desired degree of structural rigidity that makes their handling and installation between the coupling members difficult during coupling assembly. Such rectangular shaped seal rings have a tendency to collapse radially inward upon themselves, making installation within respective grooves difficult. Seal rings that are constructed having a T-shaped profile have been found to provide a desired degree of structural rigidity that makes them easy to handle and install during assembly, i.e., they do not collapse radially.

Figure 5C:
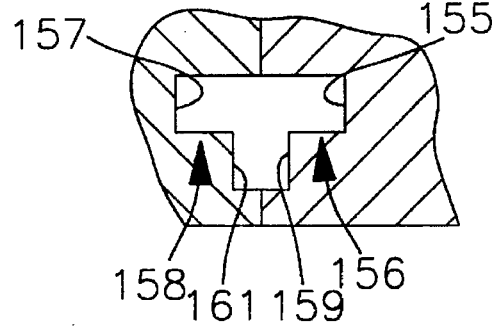
FIG. 5C is an enlarged cross-sectional side elevational view of first grooves from the coupling assembly of FIG. 5A.

The frontside surfaces 134 and 136 of the first and second coupling member flanges 130 and 132 each include first grooves 156 and 158 respectively that are recessed axially a distance into its associated frontside surface, and that are positioned adjacent each respective passageway. The first grooves 156 and 158 are each sized and configured to accommodate placement of respective first seal ring edges 144 and 146 therein. Specifically, as best shown in FIG. 5C, each first groove 156 and 158 has a stepped configuration comprising a first section 155 and 157, and a second section 159 and 161. The first section of each first groove is sized to accommodate placement of one half of the first seal ring cross member 143 and cross member edge portions 150 and 148 therein. The second section of each first groove is sized to accommodate placement of one half of the first seal ring stem member 145 and stem member edge portions 154 and 152 therein.

The first seal ring edges 144 and 146 are sized slightly larger that the first grooves 156 and 158 to provide a good interference fit when the frontside surfaces of the first and second coupling members are joined together. Specifically, the first seal ring cross member 143 is sized so that the axial distance between both the cross member edge portions 142 and 150 and the stem member edge portions 152 and 154 are slightly larger that the axial distance between the first sections 155 and 157 and second sections 159 and 160 of respective first groves when the first and second coupling members are joined together. Additionally, the radial distance that each cross member edge portion 142 and 150 extends, i.e., the radial from the top of the T to where the stem member begins, is slightly larger that the radial width of the first section 155 and 157 of respective first grooves.

In a preferred third embodiment, the first seal ring edge portions are sized in the same manner as that described above for the tongue and groove seal mechanisms in the first and second coupling embodiments. In a preferred third embodiment, for a coupling sized to be connected with a 20 millimeter (¾ inch) pipe, the axial distance between the cross member edge portions 142 and 150 of the first seal ring 142 is in the range of from 0.13 to 0.4 millimeters (0.005 to 0.015 inches) longer than the axial distance between first sections 155 and 157 of respective first grooves 156 and 158, and the radial distance that the cross member edge portions extend is in the range of from 0.05 to 0.13 millimeters (0.002 to 0.005 inches) longer wider than the radial width of the first sections 155 and 157 of respective first grooves 156 and 158.

The first seal ring 142 has an inside diameter "$d_2$" measured across the bottom surface of the stem member of the T, that is equal to an inside diameter of each passageway 138 and 140. Accordingly, the first grooves are each positioned in the frontside surfaces of respective first and second coupling member flanges so that, when installed therein, the bottom surface of the seal ring 142 is concentric with and forms a portion of the fluid flow passageways.

Second grooves 160 and 162 are located radially outwardly from each respective first groove 156 and 158 along the frontside surface 134 and 136 of each first and second coupling member flange, and are configured and sized in the same manner as the first grooves 156 and 158. A second seal ring 164 is configured in the same manner as that previously described for the first seal ring 146, in the shape of a T, with a top surface of the cross member defining an inside ring diameter, and with a bottom surface of the stem member defining an outside ring diameter. The second seal ring 164 has symmetric axially outwardly facing edge portions 166 and 168 that are directed toward respective frontside surfaces 134 and 136 of the first and second coupling member flanges when placed in the coupling. The edge portions 166 and 168 each include a cross member edge portion and a stem member edge portion. The second grooves 160 and 162 are stepped to accommodate placement of respective second ring edge portions therein.

The second seal ring 164 has an outside diameter, measured across the bottom surface of the stem member of the T, that is similar to the diameter of the circumferential edge 170 of the first coupling member flange 130. The second seal ring is sized as recited above for the first seal ring, to provide a good interference fit with the second grooves when the frontside surfaces of the first and second coupling member flanges are joined together.

Frontside surface sections 174 and 176 extend radially along respective frontside surfaces 134 and 136 between the first and second grooves, and are configured as planar surfaces to provide a complementary interface with one another when the first and second coupling member flanges are joined together. Together, the tongue and groove sealing mechanism, provided by placement of the edge portions of the first and second seal rings within respective first and second grooves, and the contact between interfacing frontside surface sections, provide a liquid-tight seal and mating coupling surfaces having a zero hold-up volume. The nut 173 is used, as previously discussed above, to retain the frontside surfaces of the first and second coupling member flanges together.

In a preferred third embodiment, it is desired that the first and second seal rings 142 and 164 be formed from Teflon®, due to the superior cold flow properties described above. The coupling members and nut can be formed from any of the materials previously described above.

If desired, an alternative third coupling embodiment can be constructed having a fluid reservoir, similar to that described above for the first coupling embodiment, interposed between the first and second seal rings and respective grooves. The fluid reservoir can be formed from the recessed frontside surface of the first and/or second coupling member flange 130 and 132, and includes one or more port(s) identical to that previously described above.

Figure 6:
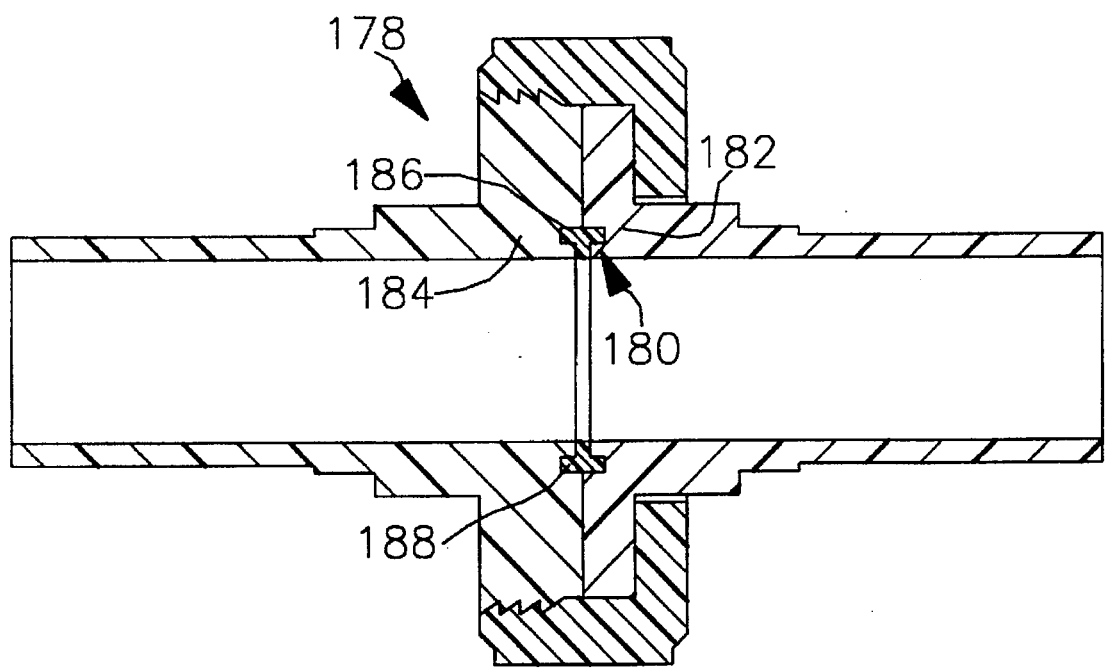
FIG. 6 is a cross-sectional side elevational view of a fourth embodiment of a coupling assembly constructed according to principles of this invention.

Referring to FIG. 6, a fourth embodiment of a coupling 178, constructed according to principles of this invention, is similar to the third coupling embodiment, except that it is constructed having only a single independent seal ring 180. The seal ring 180 is configured in the same manner as the first seal ring 142 described above for the third coupling embodiment. First and second coupling member flanges 182 and 184 each include grooves 186 and 188 that are configured the same as that described above for the first grooves.

In addition to the features previously mentioned above, another key feature of couplings constructed according to principles of this invention is that, unlike couplings that employ O-ring type seal mechanisms, it does not include any material that could provide a source of potential process fluid contamination. Therefore, use of the coupling in piping systems that transport high-purity process fluid does not present a risk of process fluid contamination, and thereby eliminates the risk of product contamination.

Although limited embodiments of the coupling have been specifically described and illustrated herein, and specific dimensions have been disclosed, many modifications and variations will be apparent to those skilled in the art. Accordingly, it is to be understood that, within the scope of the appended claims, the coupling according to principles of this invention may be embodied other than as specifically described herein.

What is claimed is:

1. A coupling apparatus comprising:
   first and second coupling members each in the form of a hollow conduit and each comprising:
   a radially extending flange having an axially facing frontside surface at a first end of each coupling member;
   a sleeve extending axially away from the flange to a second end of each coupling member that is adapted to accommodate attachment with a fluid handling member; and
   a fluid flow passageway extending through the coupling member from the first to the second end;
   wherein the frontside surface of the first coupling member flange includes at least one tongue that projects axially a distance outwardly away from the frontside surface and is positioned concentrically around the passageway, the tongue having non-tapered radially directed surfaces; and
   wherein the frontside surface of the second coupling member flange includes at least one groove disposed therein that is positioned to accommodate placement of a respective first coupling member tongue therein, the groove having non-tapered radially directed surfaces and a radial width between non-tapered radially directed surfaces that is less than a radial width of the tongue, and the tongue having an axial length that is greater than an axial length of the groove, the differences in radial width and axial length of the tongue and groove providing an interference fit therebetween that forms a liquid-tight seal between the first and second coupling members when the frontside surfaces of the first and second coupling member flanges are brought together; and
   means for maintaining frontside surfaces of the first and second coupling member flanges joined together.

2. A coupling apparatus as recited in claim 1 wherein the flange, sleeve and tongue of the first coupling member are each integral with the first coupling member, and wherein the flange, sleeve and groove of the second coupling member are each integral with of the second coupling member.

3. A coupling apparatus as recited in claim 1 wherein the frontside surface of each first and second coupling member flange includes at least one complementary substantially planar surface sections that are configured to accommodate interfacing contact with one another when frontside surfaces of the first and second coupling member flanges are joined together.

4. A coupling apparatus as recited in claim 3 wherein the tongue completely fills the groove when the first and second coupling flanges are brought together, and wherein the tongue and groove and planer frontside surface sections of each respective first and second coupling member are configured to provide a zero hold-up volume when the frontside surfaces of the first and second coupling member flanges are joined together and when fluid is transported through the passageways.

5. A coupling apparatus as recited in claim 1 wherein the frontside surface of the first coupling member flange comprises two such tongues, each projecting axially outwardly away from the frontside surface and positioned concentrically around the fluid flow passageway, and wherein the frontside surface of the second coupling member flange comprises two such grooves that are each positioned to accommodate placement of respective tongues therein.

6. A coupling apparatus as recited in claim 5 further comprising a fluid reservoir disposed in a frontside surface selected from the group consisting of the first coupling member flange, the second coupling member flange, and combinations thereof, wherein the fluid reservoir is positioned radially between each tongue and respective groove set to thereby accommodate fluid that has leaked past a seal formed between a mating tongue and groove.

7. A coupling apparatus as recited in claim 6 wherein one of the first or second coupling member flanges includes a leak port extending axially therethrough from the reservoir to a backside flange surface.

8. A coupling apparatus as recited in claim 1 wherein the means for maintaining the first and second coupling members together is a nut having a threaded inside surface and a shoulder at one end that has an opening therethrough, wherein the nut is disposed axially around the joined together frontside surface of the first and second coupling member flanges so that an inside surface of the shoulder engages a backside surface of one flange and the threaded inside surface engages a threaded outside surface around a circumferential edge of an adjacent flange.

9. A coupling apparatus as recited in claim 1 wherein each tongue is configured having an axial length to radial width ratio in the range of from about 1.5:1 to 2:1.

10. The coupling apparatus as recited in claim 1 wherein the tongue is integral with the frontside surface of the first coupling member, and wherein the first and second coupling members are formed from fluoropolymeric materials having properties of cold flow to provide the interference fit between the tongue and groove.

11. A coupling apparatus comprising:
    first and second coupling members each in the form of a hollow conduit and each including:
    a radially extending flange at a first end of each coupling member;
    a sleeve extending axially away from the flange to a second end of each coupling member, wherein the second end is end adapted to accommodate attachment with a fluid handling member; and
    a fluid flow passageway extending through each coupling member from the first to the second end, wherein the radially extending flange includes an axially facing frontside surface;
    wherein the frontside surface of the first coupling member flange includes two integral tongues that each project axially a distance outwardly from the frontside surface, and wherein the tongues are positioned concentrically around the passageway, the tongues having non-tapered radially facing surfaces; and
    wherein the frontside surface of the second coupling member flange includes two integral grooves that are each recessed axially a distance into the frontside surface, and wherein the grooves have non-tapered radially facing surfaces and are positioned concentrically around the passageway to accommodate placement of respective tongues therein to form an interference fit therebetween when frontside surfaces of the first and second coupling member flanges are joined together; and a nut disposed around the first and second coupling member flanges to maintain frontside surfaces of the first and second coupling member flanges joined together.

12. A coupling apparatus as recited in claim 11 wherein the first coupling member flange further includes:

a planar first surface section that extends radially along the frontside surface between the first tongue and the passageway;

a planar second surface section that extends radially along the frontside surface between the first tongue and the second tongue; and a planar third surface section that extends radially along the frontside surface between the second tongue and a peripheral flange edge;

wherein the second coupling member flange further includes:

a planar first surface section that extends radially along the frontside surface between the first groove and the passageway;

a planar second surface section that extends radially along the frontside surface between the first groove and the second groove; and a planar third surface section that extends radially along the frontside surface between the second groove and a peripheral flange edge;

wherein the first, second and third surface sections of the first coupling member flange is each configured to provide interfacing contact with respective first, second and third surface sections of the second coupling member flange and thereby provide a zero hold-up volume of liquid between the coupling member flanges when the frontside surfaces are joined together.

13. A coupling apparatus as recited in claim 11 further comprising a fluid reservoir disposed in a frontside surface selected from the group consisting of the first coupling member flange, the second coupling member flange, and combinations thereof, wherein the fluid reservoir is radially positioned between the two coupling member flanges to thereby accommodate fluid that has leaked past a seal formed between a mating tongue and groove.

14. A coupling apparatus as recited in claim 13 wherein one of the first or second coupling member flanges includes a leak port extending axially therethrough from the reservoir to a backside flange surface.

15. A coupling apparatus as recited in claim 11 wherein the nut has a threaded inside surface and includes a shoulder at one end having an opening therethrough, wherein the nut is disposed axially around the joined together frontside surface of the first and second coupling member flanges so that an inside surface of the shoulder engages a backside surface of one flange and the threaded inside surface engages a threaded outside surface around a circumferential edge of an adjacent flange.

16. The coupling apparatus as recited in claim 11 wherein each tongue has a radial width between non-tapered radially facing surfaces that is greater than a radial width between non-tapered radially facing surfaces of each respective groove, each tongue having an axial length that is greater than an axial length of each respective groove, wherein each tongue is disposed completely within each respective groove when the first and second coupling members are joined together to form a liquid-tight seal therebetween having a zero hold-up volume.

17. The coupling apparatus as recited in claim 11 wherein the first and second coupling members are formed from fluoropolymeric materials having properties of cold flow to provide the interference fit between respective tongues and grooves.

18. A coupling apparatus comprising:

first and second coupling members each in the form of a hollow cylindrical conduit, the first and second coupling member each having:

a radially extending flange at a first end of each coupling member;

a sleeve extending axially away from the flange to a second end of each coupling member, wherein the second end is adapted to accommodate attachment with a fluid handling member; and a fluid flow passageway extending through the coupling member from the first to the second end, wherein the flange of each coupling member includes an axially facing frontside surface having at least one groove disposed therein positioned concentrically around the passageway, the groove having non tapered radially facing surfaces;

at least one seal ring interposed between the frontside surfaces of the first and second coupling member flanges, the seal ring having a one-piece construction and including tongues that project axially from opposing seal ring edges, the tongues having non-tapered radially facing surfaces, the tongues being placed within each respective groove of the first and second coupling member flanges to completely fill each respective groove and provide a liquid-tight interference seal therebetween when the frontside surfaces of the first and second coupling member flanges are joined together; and means for maintaining frontside surfaces of the first and second coupling member flanges joined together.

19. A coupling apparatus as recited in claim 18 wherein the seal ring has a T-shaped radial cross-sectional profile defined by a cross member and a stem member, the cross member being formed from first axially projecting tongues, and the stem member being formed from second axially projecting tongues, wherein the first tongues extend axially longer than the second tongues.

20. A coupling apparatus as recited in claim 17 wherein the groove in each frontside surface of the first and second coupling member flange has a stepped configuration to accommodate placement of a respective first and second tongue therein.

21. A coupling apparatus as recited in claim 18 wherein the frontside surface of each first and second coupling member flange includes:

a first groove positioned concentrically around each respective passageway; and a second groove positioned concentrically around each respective first groove, wherein the first and second grooves each have a stepped configuration; and wherein the coupling apparatus comprises a first seal ring sized to permit placement of the axially projecting tongues within the respective first grooves, and a second seal ring sized to permit placement of the axially projecting tongues within the respective second grooves.

22. A coupling apparatus as recited in claim 18 wherein the means for maintaining the frontside surfaces joined together comprises a nut having a threaded inside surface, wherein the nut includes a shoulder at one end having an opening therethrough, wherein the nut is installed around joined together frontside surfaces of the first and second coupling member flanges so that an inside surface of the shoulder engages a backside surface of one flange and so that the threaded inside surface engages a threaded outside surface around a circumferential edge of an adjacent flange.

23. The coupling apparatus as recited in claim 18 wherein each tongue has a radial width between non-tapered radially facing surfaces that is greater than a radial width between non-tapered radially facing surfaces of each respective groove, each tongue having an axial length that is greater than an axial length of each respective groove, wherein each tongue is disposed completely within each respective groove when the first and second coupling members are joined together, and wherein the liquid-tight seal formed therebetween has a zero hold-up volume.

24. The coupling apparatus as recited in claim 18 wherein the seal ring and first and second coupling members are each formed from fluoropolymeric materials having properties of cold flow to provide an interference fit between respective tongues and grooves.

25. A coupling apparatus comprising:

first and second coupling members each in the form of a hollow conduit, the first and second coupling member each including:
  a radially extending flange at a first end of each coupling member;
  a sleeve extending axially away from the flange to a second end of each coupling member, wherein the second end is adapted to accommodate attachment with a fluid handling member; and
  a fluid flow passageway extending through each coupling member from the first to the second end, wherein the flange includes an axially facing frontside surface having two grooves disposed therein, and wherein a first groove is positioned concentrically around the passageway and a second groove is positioned concentrically around the first groove, the first and second grooves having non-tapered radially facing surfaces;

first and second seal rings each interposed between the frontside surfaces of the first and second coupling member flanges, the first and second seal rings each having a one-piece construction and including tongues that project axially from opposing seal ring edges, the tongues having non-tapered radially facing surfaces that are sized to completely fill and provide an interference fit within respective first and second grooves to form liquid-tight seals therebetween when the frontside surfaces of the first and second coupling member flanges are joined together; and a nut disposed around the first and second coupling member flanges to maintain respective frontside surfaces joined together.

26. A coupling apparatus as recited in claim 25 wherein the first and second seal rings each have a T-shaped radial cross-sectional profile defined by a cross member and a stem member, the cross member being formed from first axially projecting tongues, and the stem member being formed from second axially projecting tongues, wherein the first tongues extend axially longer than the second tongues.

27. A coupling apparatus as recited in claim 26 wherein the first and second grooves each have has a stepped configuration to accommodate placement of the first and second tongues of each first and second ring therein.

28. A coupling apparatus as recited in claim 26 wherein the nut includes a threaded inside surface and a shoulder at one end having an opening therethrough, wherein the nut is installed around joined together frontside surfaces of the first and second coupling member flanges so that an inside surface of the shoulder engages a backside surface of one flange and so that the threaded inside surface engages a threaded outside surface around a circumferential edge of an adjacent flange.

29. The coupling apparatus as recited in claim 25 wherein the tongues of the seal ring have a radial width between non-tapered radially facing surfaces that is greater than a radial width between non-tapered radially facing surfaces of respective first and second grooves, the tongues of each first and second seal ring having an axial length that is greater than an axial length of respective first and second grooves, wherein the tongues of each first and second seal ring is disposed completely within each respective first and second groove when the first and second coupling members are joined together to form liquid-tight seals formed therebetween having a zero hold-up volume.

30. The coupling apparatus as recited in claim 25 wherein the seal rings and first and second coupling members are each formed from fluoropolymeric materials having properties of cold flow to provide the interference fit between respective tongues and grooves.

31. A coupling apparatus comprising:

a first and second coupling member, each coupling member having a radially extending flange at one end, a sleeve for accommodating attachment to a fluid handling member at an opposite end, and a fluid flow passageway extending therebetween, the flange including an axially facing frontside surface;

wherein the frontside surface of the first coupling member flange includes at least one integral tongue that projects axially a distance outwardly away from the frontside surface and is positioned concentrically around the passageway, the tongue having non-tapered radially facing surfaces that define a tongue radial width;

wherein the frontside surface of the second coupling member flange includes at least one groove disposed axially therein that is radially positioned to accommodate placement of such first coupling member tongue therein, the groove having non-tapered radially facing surfaces that define a groove radial width;

wherein the tongue radial width is greater than the groove radial width, and wherein the tongue has an axial length that is greater than an axial length of the groove to completely fill the groove and provide an interference fit therebetween when the first and second coupling members are joined together; and means for maintaining frontside surfaces of the first and second coupling member flanges joined together.

* * * * *